(12) United States Patent
Toler

(10) Patent No.: US 12,532,999 B2
(45) Date of Patent: Jan. 27, 2026

(54) SOLAR-POWERED VACUUM DEVICE

(71) Applicant: Jeanie Toler, Olivehurst, CA (US)

(72) Inventor: Jeanie Toler, Olivehurst, CA (US)

( * ) Notice: Subject to any disclaimer, the term of this patent is extended or adjusted under 35 U.S.C. 154(b) by 337 days.

(21) Appl. No.: 18/337,467

(22) Filed: Jun. 20, 2023

(65) Prior Publication Data
US 2024/0016355 A1 Jan. 18, 2024

Related U.S. Application Data

(60) Provisional application No. 63/388,661, filed on Jul. 13, 2022.

(51) Int. Cl.
| H02S 10/20 | (2014.01) |
| A47L 9/06 | (2006.01) |
| A47L 9/14 | (2006.01) |
| A47L 9/24 | (2006.01) |
| A47L 9/28 | (2006.01) |
| A47L 9/30 | (2006.01) |
| A47L 9/32 | (2006.01) |
| H02S 10/40 | (2014.01) |

(52) U.S. Cl.
CPC .......... A47L 9/2884 (2013.01); A47L 9/0673 (2013.01); A47L 9/0693 (2013.01); A47L 9/1463 (2013.01); A47L 9/149 (2013.01); A47L 9/244 (2013.01); A47L 9/248 (2013.01); A47L 9/2857 (2013.01); A47L 9/30 (2013.01); A47L 9/322 (2013.01); H02S 10/20 (2014.12); H02S 10/40 (2014.12)

(58) Field of Classification Search
CPC . A47L 9/2884; A47L 5/24; A47L 9/06; A47L 9/04; A47L 9/0693; H02S 10/20
See application file for complete search history.

(56) References Cited

U.S. PATENT DOCUMENTS

| 8,302,251 | B2 | 11/2012 | Beskow | |
| 9,993,125 | B2 | 6/2018 | Hu | |
| 10,277,163 | B1* | 4/2019 | Meller | ................... B08B 13/00 |
| 10,765,276 | B2 | 9/2020 | Shinagawa | |
| 10,966,581 | B2 | 4/2021 | Innes | |
| 2012/0152877 | A1* | 6/2012 | Tadayon | ................. F24S 25/10 |
| | | | | 901/30 |
| 2019/0282053 | A1 | 9/2019 | Tian | |
| 2020/0253446 | A1* | 8/2020 | Gilbert | ...................... A47L 5/28 |
| 2021/0204779 | A1* | 7/2021 | Paulla | ................... A47L 9/1608 |
| 2023/0157502 | A1* | 5/2023 | Hahn | ...................... A47L 9/325 |
| | | | | 15/319 |

* cited by examiner

Primary Examiner — Michael D Jennings
(74) Attorney, Agent, or Firm — Brennan, Manna & Diamond, LLC

(57) ABSTRACT

The present invention relates to a solar-powered vacuum device primarily comprised of a telescopic first end that can receive at least one attachment, a removable canister, and at least one solar panel that powers at least one battery. A vacuum motor of the device can be powered by the battery, such that the vacuum can be used in any environment. The device is also comprised of at least one shoulder strap that allows the device to be used hands-free. In addition, the body of the device is primarily comprised of at least one light source that illuminates the area around the vacuum.

12 Claims, 3 Drawing Sheets

SOLAR-POWERED VACUUM DEVICE

CROSS-REFERENCE TO RELATED APPLICATION

The present application claims priority to, and the benefit of, U.S. Provisional Application No. 63/388,661, which was filed on Jul. 13, 2022, and is incorporated herein by reference in its entirety.

FIELD OF THE INVENTION

The present invention relates generally to the field of vacuums. More specifically, the present invention relates to a solar-powered vacuum device primarily comprised of a telescopic first end that can receive at least one attachment, a removable canister, and at least one solar panel that powers at least one battery. A vacuum motor of the device can be powered by the battery such that the vacuum can be used in any environment. The device is also comprised of at least one shoulder strap that allows the device to be used hands-free. In addition, the body of the device is primarily comprised of at least one light source that illuminates the area around the vacuum. Accordingly, the present disclosure makes specific reference thereto. Nonetheless, it is to be appreciated that aspects of the present invention are also equally applicable to other like applications, devices, and methods of manufacture.

BACKGROUND

Existing vacuums known in the art require a battery or an electrical cord and power source to function. However, many individuals desire to use vacuums to vacuum vehicles or other areas that lack an electrical outlet. Said places also include outdoor areas such as a camping tent, an RV, etc. As a result, a user may be unable to vacuum said areas using existing vacuums. In addition, existing vacuums often require both hands to be used, or at least one hand. Further, existing vacuums known in the art may not be long enough to vacuum desired areas. However, longer vacuums may be equally as undesirable as they take up a significant amount of storage space. In addition, many users may desire to vacuum dark areas, but cannot be due to a lack of light.

Therefore, there exists a long-felt need in the art for an improved vacuum. There also exists a long-felt need in the art for a solar-powered vacuum device that can be used in various areas without power outlets and can also be charged. Further, there exists a long-felt need in the art for a solar-powered vacuum device that offers the benefits of longer and shorter vacuums. In addition, there exists a long-felt need in the art for a solar-powered vacuum device that can be used without having to have both hands on the device. Finally, there exists a long-felt need in the art for a solar-powered vacuum device that can be used in dark areas.

The subject matter disclosed and claimed herein, in one embodiment thereof, comprises a solar-powered vacuum device. The device is primarily comprised of a telescopic first end that can receive at least one attachment, a removable canister, and at least one solar panel that powers at least one battery. A vacuum motor of the device can be powered by the battery such that the vacuum can be used in any environment. The device is also comprised of at least one shoulder strap that allows the device to be used hands-free. In addition, the body of the device is primarily comprised of at least one light source that illuminates the area around the vacuum. Debris collected by the vacuum can be removed from the device and disposed of via the removable canister.

In this manner, the solar-powered vacuum device of the present invention accomplishes all of the foregoing objectives and provides an improved vacuum that can be used in various areas without power outlets and can also be charged. Further, the telescopic first end offers the benefits of longer and shorter vacuums. In addition, the device can be used without having to have both hands on the device and can be used in dark or dimly lit areas.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a solar-powered vacuum device. The device is primarily comprised of a telescopic first end that can receive at least one attachment, a removable canister, and at least one solar panel that powers at least one battery. The body of the device is preferably cylindrical in shape with a telescopic first end that allows the device to increase and/or decrease in length as needed while vacuuming or while stored. In a telescopic embodiment, the first end is comprised of at least one lock that allows a user to lock the first end at the desired length. To aid the user in manipulating the device, the body may be comprised of at least one handle with at least one grip area that aids a user in better grasping the handle. The body is also comprised of at least one strap that can be worn on the shoulder of a user while using the device.

The first end is comprised of at least one opening that allows at least one attachment to attach to the first end. The attachment is used as the vacuum head of the device and may be any vacuum head attachment style known in the art. The body is also comprised of at least one vacuum motor powered by at least one battery. In the preferred embodiment, the body is comprised of at least one solar panel that provides power to the battery. The body may also be comprised of at least one light. The light is preferably an LED light that illuminates the area that the device is vacuuming. In one embodiment, the light 180 has a plurality of brightness levels.

The body is hollow, such that any debris vacuumed at the first end travels through the body, through a second-end opening, and into a removable canister at the second end. The canister can then be removed from the body to dispose of debris. In this manner, the device does not require a vacuum bag and can be easily emptied.

Accordingly, the solar-powered vacuum device of the present invention is particularly advantageous as it provides an improved vacuum that can be used in various areas without power outlets and can also be charged. In addition, the telescopic first end offers the benefits of longer and shorter vacuums. In this manner, the solar-powered vacuum device overcomes the limitations of existing vacuums known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
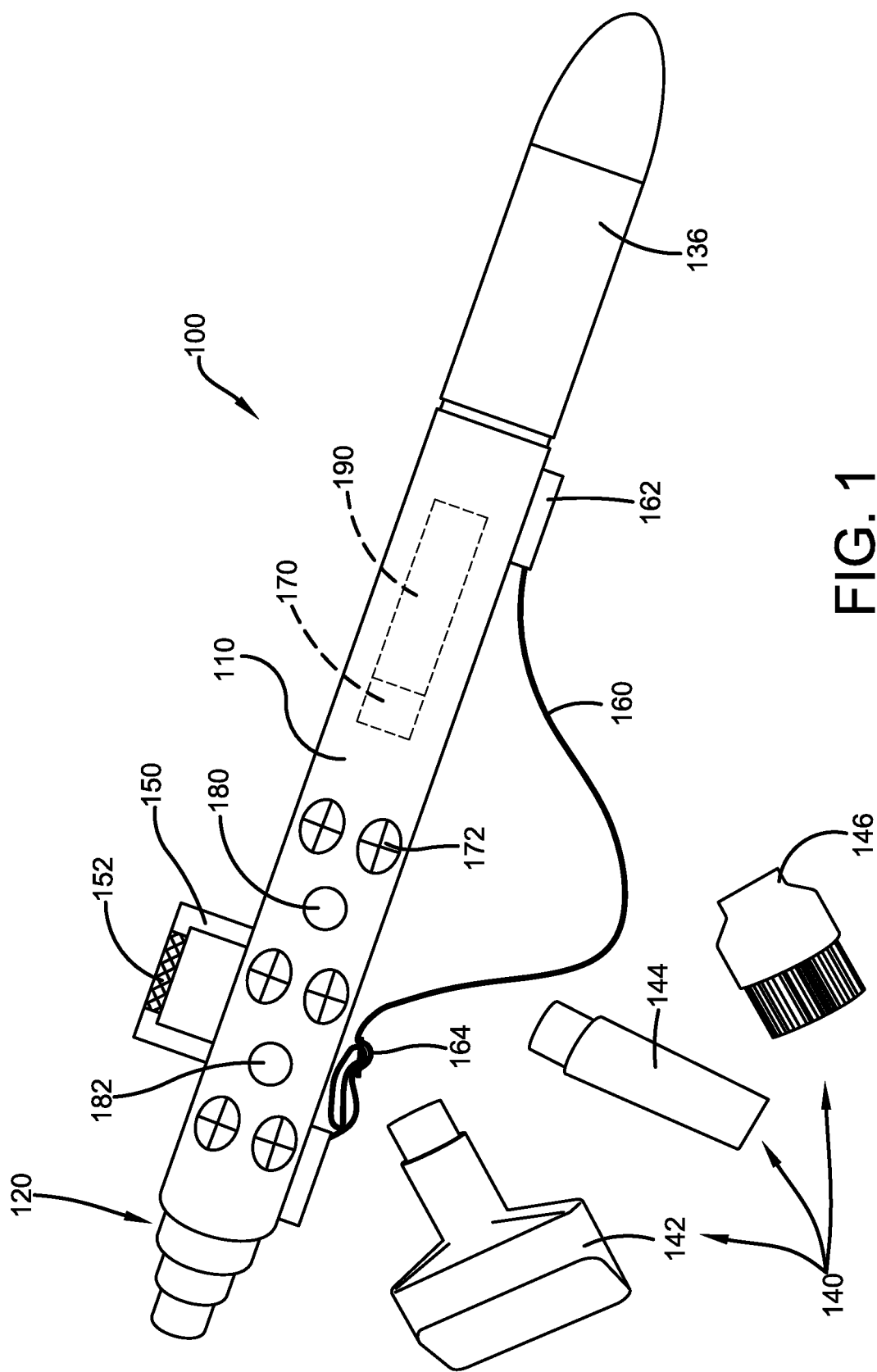
FIG. 1 illustrates a perspective view of one potential embodiment of a solar-powered vacuum device of the present invention while not extended in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved vacuum. There also exists a long-felt need in the art for a solar-powered vacuum device that can be used in various areas without power outlets and can also be charged. Further, there exists a long-felt need in the art for a solar-powered vacuum device that offers the benefits of longer and shorter vacuums. In addition, there exists a long-felt need in the art for a solar-powered vacuum device that can be used without having both hands on the device. Finally, there exists a long-felt need in the art for a solar-powered vacuum device that can be used in dark areas.

The present invention, in one exemplary embodiment, is comprised of a solar-powered vacuum device. The subject matter disclosed and claimed herein, in one embodiment thereof, comprises a solar-powered vacuum device. The device is primarily comprised of a telescopic first end that can receive at least one attachment, a removable canister, and at least one solar panel that powers at least one battery. The body of the device is preferably cylindrical in shape with a telescopic first end that allows the device to increase and/or decrease in length as needed while vacuuming or while stored. In a telescopic embodiment, the first end is comprised of at least one lock. The lock allows a user to lock the first end at the desired length. The body may be comprised of at least one handle with at least one grip area that aids a user in better grasping the handle. The body is also comprised of at least one strap that can be worn on the shoulder of a user while using the device.

The first end is comprised of at least one opening. The opening allows at least one attachment to attach to the first end. The attachment is used as the vacuum head of the device and may be any vacuum head attachment style known in the art. The body is also comprised of at least one vacuum motor powered by at least one battery. At least one solar panel of the body provides power to the battery. The body may also be comprised of at least one light. The light is preferably an LED light that illuminates the area that the device is vacuuming. In one embodiment, the light 180 has a plurality of brightness levels.

The body is hollow, such that any debris vacuumed at the first end travels through the body, through a second-end opening, and into a removable canister at the second end. The canister can then be removed from the body to dispose of debris. In this manner, the device does not require a vacuum bag and can be easily emptied.

Accordingly, the solar-powered vacuum device of the present invention is particularly advantageous as it provides an improved vacuum that can be used in various areas without power outlets and can always be charged. In addition, the telescopic first end offers the benefits of longer and shorter vacuums. In this manner, the solar-powered vacuum device overcomes the limitations of existing vacuums known in the art.

Referring initially to the drawings, FIG. 1 illustrates a perspective view of one potential embodiment of a solar-powered vacuum device 100 of the present invention while not extended in accordance with the disclosed architecture. The device 100 is primarily comprised of a telescopic first end 120 that can receive at least one attachment 140, a removable canister 136, and at least one solar panel 172 that powers at least one battery 170. Unless otherwise specified herein, the device 100 and all components are preferably made from a durable metal such as, but not limited to, stainless steel or aluminum or a rigid plastic such as, but not limited to, acrylic, polycarbonate, polyethylene, thermoplastic, acrylonitrile butadiene styrene, low-density polyethylene, medium-density polyethylene, high-density polyethylene, polyethylene terephthalate, polyvinyl chloride, polystyrene, polylactic acid, acetal, nylon, fiberglass, recycled plastic, biodegradable plastic, etc.

Figure 2:
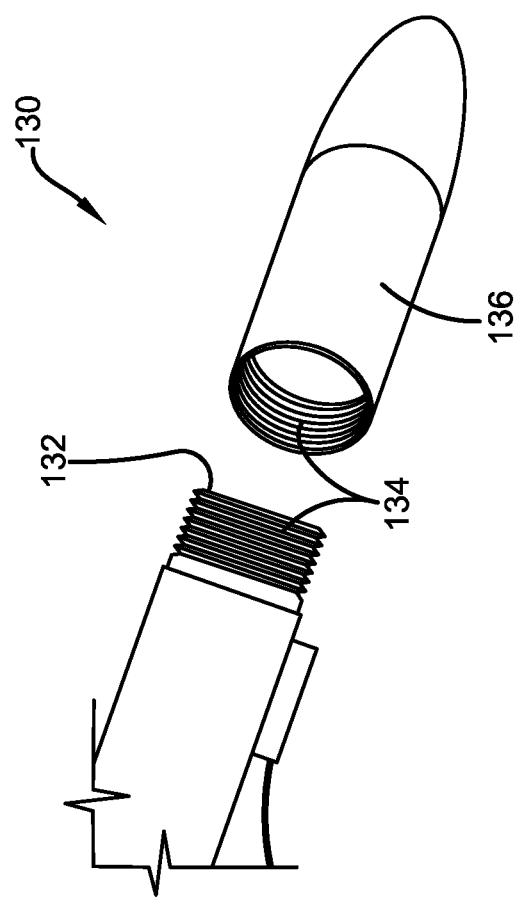
FIG. 2 illustrates a perspective view of one potential embodiment of a solar-powered vacuum device of the present invention while extended in accordance with the disclosed architecture.

The body 110 of the device 100 is preferably cylindrical in shape but may be any shape in differing embodiments. The first end 120 of the body 110 may be of a fixed length. In another embodiment, the first end 120 is telescopic such that the device 100 can increase and/or decrease in length as needed while vacuuming or while stored, as seen in FIG. 2. In a telescopic embodiment, the first end 120 is comprised of at least one lock 124 that allows a user to lock the first end 120 at the desired length. The lock 124 may be any lock type known in the art such as, but not limited to, a clasp, a latch, a clip, etc.

To aid the user in manipulating the device 100, the body 110 may be comprised of at least one handle 150 with at least one grip area 152 that aids a user in better grasping the handle 150. The grip area 152 is preferably manufactured from a textured rubber material that improves grip. The body 110 is also comprised of at least one strap 160 that can be worn on the shoulder of a user while using the device 100. In one embodiment, the strap 160 is adjustable in length via at least one adjustment fastener 164 such as, but not limited to, a slide buckle. In one embodiment, the strap 160 is fixedly attached to the body 110. In another embodiment, the strap 160 is removably attached to the body 110 via at least one attachment fastener 162 such as, but not limited to, a clip, a clasp, hook, and loop, magnet, etc. The strap 160 is preferably comprised of a padded material for comfort.

The first end 120 is comprised of at least one opening 122 that allows at least one attachment 140 to attach to the first end via reciprocating fasteners 134 such as, but not limited to, threads, tongue and groove, snaps, clips, etc. The attachment 140 is used as the vacuum head of the device 100. The attachment 140 may differ in various embodiments. The attachment 140 may be in the form of a wide head attachment 142, a long head attachment 144, and/or a bristled attachment 146. Each attachment 142, 144, 146 allows a user to more easily vacuum using the device 100 in various locations. In one embodiment, the attachment 140 may be any vacuum head attachment style known in the art.

The body 110 is also comprised of at least one vacuum motor 190. The motor 190 may be any vacuum motor type known in the art. The motor 190 is powered by at least one battery 170. The battery 170 may be a disposable battery 170 or a rechargeable battery 170 in the form of an alkaline, nickel-cadmium, nickel-metal hydride battery 170, etc., such as any 3V-12 volts DC battery 170 or other conventional battery 170 such as A, AA, AAA, etc., that supplies power to the device 100. Throughout this specification, the terms "battery" and "batteries" may be used interchangeably to refer to one or more wet or dry cells or batteries 170 of cells in which chemical energy is converted into electricity and used as a source of DC power. References to recharging or replacing batteries 170 may refer to recharging or replacing individual cells, individual batteries 170 of cells, or a package of multiple battery cells as is appropriate for any given battery 170 technology that may be used. In the preferred embodiment, the body 110 is comprised of at least one solar panel 172 that provides power to the battery 170. The solar panel 172 may be comprised of, but not limited to, monocrystalline silicon, polycrystalline silicon, or a photovoltaic cell film.

The body 110 may also be comprised of at least one light 180 powered by the battery 170. The light 180 is preferably an LED light. The light 180 illuminates the area that the device 100 is vacuuming. In one embodiment, the light 180 has a plurality of brightness levels. The light 180 can be turned on/off and the brightness level can be adjusted via at least one button 182.

Figure 3:
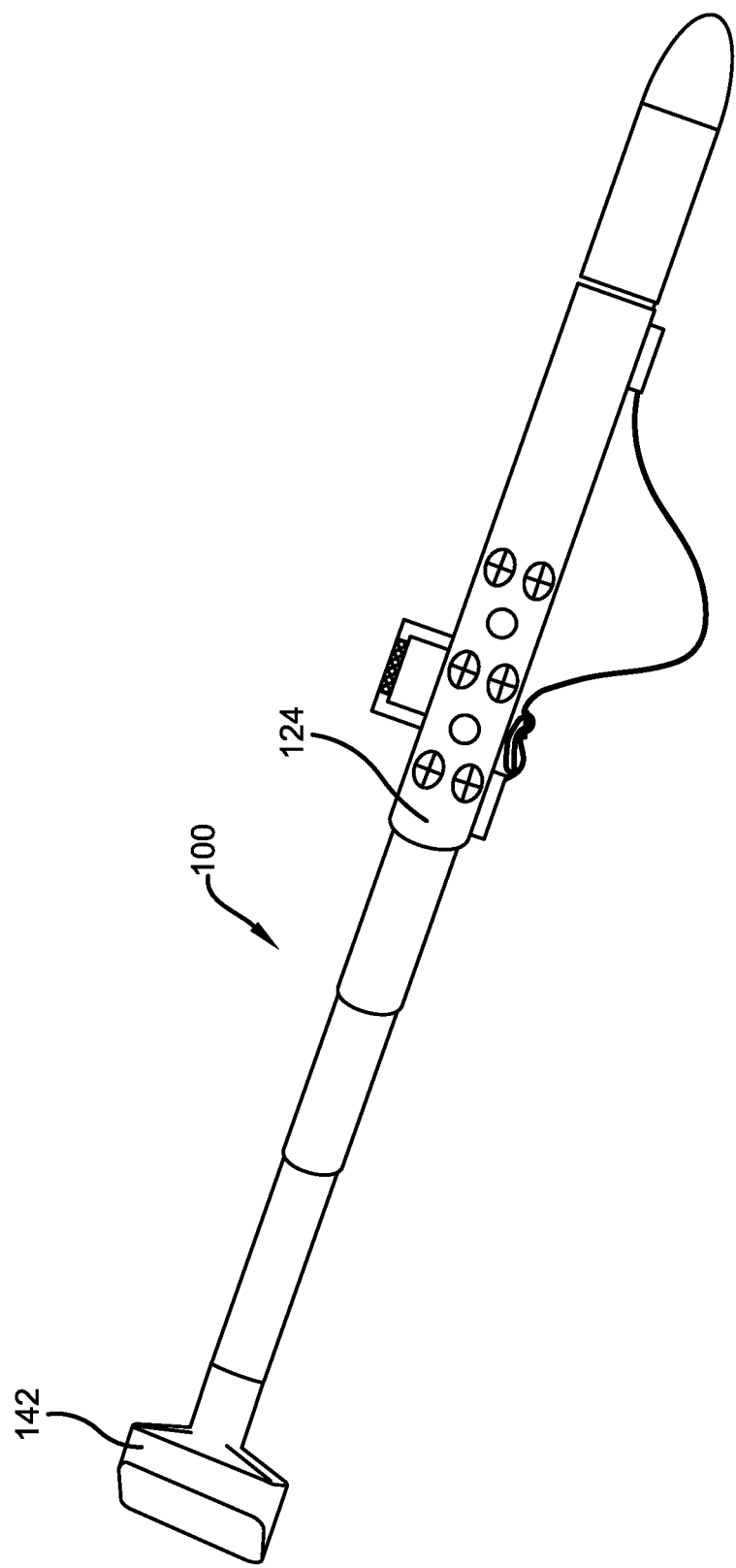
FIG. 3 illustrates an enhanced perspective view of a second end of one potential embodiment of a solar-powered vacuum device of the present invention while disassembled in accordance with the disclosed architecture.

FIG. 3 illustrates an enhanced perspective view of a second end 130 of one potential embodiment of a solar-powered vacuum device 100 of the present invention while disassembled in accordance with the disclosed architecture. The body 110 is hollow, such that any debris vacuumed at the first end 120 travels through the body 110, through a second end opening 132, and into a removable canister 136 at the second end 130. The canister 136 can then be removed from the body 110 to dispose of debris. In this manner, the device 100 does not require a vacuum bag and can be emptied in a simple manner. In the preferred embodiment, the canister 136 attaches to the second end 130 via reciprocating fasteners 134 such as, but not limited to, threads, tongue and groove, snaps, clips, etc.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "solar-powered vacuum device" and "device" are interchangeable and refer to the solar-powered vacuum device 100 of the present invention.

Notwithstanding the foregoing, the solar-powered vacuum device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the solar-powered vacuum device 100 as shown in the FIGS. are for illustrative purposes only, and that many other sizes and shapes of the solar-powered vacuum device 100 are well within the scope of the present disclosure. Although the dimensions of the solar-powered vacuum device 100 are important design parameters for user convenience, the solar-powered vacuum device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A solar-powered vacuum device comprising:
   a body comprised of a handle;
   a telescopic first end comprised of an opening and a lock;
   an attachment that attaches to the telescopic first end;
   a strap comprised of an adjustment fastener and an attachment fastener;
   a button;
   a battery;
   a solar panel that charges the battery;
   a light; and
   a vacuum motor powered by the battery.

2. The solar-powered vacuum device of claim 1, wherein the handle is comprised of a grip area.

3. The solar-powered vacuum device of claim 1, wherein the lock locks the telescopic end at a desired length.

4. The solar-powered vacuum device of claim 1, wherein the attachment fastener attaches to the body.

5. The solar-powered vacuum device of claim 4, wherein the attachment fastener is comprised of a clip, a clasp, a hook and loop fastener or a magnet.

6. The solar-powered vacuum device of claim 1, wherein the adjustment fastener is comprised of a slide buckle.

7. The solar-powered vacuum device of claim 1, wherein the attachment is comprised of a wide head vacuum attachment.

8. The solar-powered vacuum device of claim 1, wherein the attachment is comprised of a long head vacuum attachment.

9. The solar-powered vacuum device of claim 1, wherein the attachment is comprised of a bristled-head vacuum attachment.

10. The solar-powered vacuum device of claim 1, wherein the light is comprised of an LED light.

11. The solar-powered vacuum device of claim 10, wherein the light is comprised of a first brightness level and a second brightness level.

12. The solar-powered vacuum device of claim 11, wherein the light can be controlled by a button.

\* \* \* \* \*